US011120067B2

(12) United States Patent
Tripodi et al.

(10) Patent No.: US 11,120,067 B2
(45) Date of Patent: Sep. 14, 2021

(54) PRESENT CONTROLLED HETEROGENEOUS DIGITAL CONTENT TO USERS

(71) Applicant: International Business Machines Corporation, Armonk, NY (US)

(72) Inventors: Viviana Tripodi, Rome (IT); Alessandro Donatelli, Rome (IT)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 16/037,113

(22) Filed: Jul. 17, 2018

(65) Prior Publication Data

US 2020/0026769 A1 Jan. 23, 2020

(51) Int. Cl.
*G06F 16/40* (2019.01)
*G06F 16/435* (2019.01)
*G06F 16/438* (2019.01)
*G06F 16/2457* (2019.01)

(52) U.S. Cl.
CPC ...... *G06F 16/437* (2019.01); *G06F 16/24573* (2019.01); *G06F 16/438* (2019.01)

(58) Field of Classification Search
CPC . G06F 16/437; G06F 16/24576; G06F 16/438
See application file for complete search history.

(56) References Cited

U.S. PATENT DOCUMENTS

| | | | |
|---|---|---|---|
| 8,577,896 B2 | 11/2013 | Sanders | |
| 8,887,095 B2 | 11/2014 | Krishnamurthy et al. | |
| 8,903,834 B2 | 12/2014 | Ciancutti et al. | |
| 9,129,227 B1* | 9/2015 | Yee | G06N 20/00 |
| 9,454,530 B2 | 9/2016 | Sabah et al. | |
| 10,223,458 B1* | 3/2019 | Decker | G06F 15/0291 |
| 2010/0250341 A1 | 10/2010 | Hauser | |
| 2012/0254170 A1 | 10/2012 | Choe et al. | |
| 2014/0280548 A1* | 9/2014 | Langlois | H04L 67/306 |
| | | | 709/204 |
| 2015/0365725 A1* | 12/2015 | Belyaev | H04N 21/8133 |
| | | | 725/46 |
| 2016/0364481 A1 | 12/2016 | Basilico | |
| 2017/0139657 A1* | 5/2017 | Shah | G06F 3/14 |

(Continued)

OTHER PUBLICATIONS

Shin et al., "Personalized digital TV content recommendation with integration of user behavior profiling and multimodal content rating," IEEE Transactions on Consumer Electronics, vol. 55, Issue 3, Aug. 2009, pp. 1417-1423.

(Continued)

*Primary Examiner* — Kris E Mackes
*Assistant Examiner* — Tiffany Thuy Bui
(74) *Attorney, Agent, or Firm* — VanLeeuwen & VanLeeuwen; Jeffrey S. LaBaw

(57) ABSTRACT

An approach is provided to present controlled heterogeneous digital content to users. The approach receives topics corresponding to content items that were previously accessed by a user, such as having been watched by the user on a display device. Opposing topics are associated to the identified topics with each of the opposing topics being opposite to the corresponding topic. A user position score is calculated based upon at least some of the opposing topics. This position score is used to identify content recommendations which are then presented to the user.

11 Claims, 7 Drawing Sheets

(56) References Cited

U.S. PATENT DOCUMENTS

| | | | | |
|---|---|---|---|---|
| 2017/0293698 A1* | 10/2017 | Abebe | .................. | G06F 16/904 |
| 2018/0114136 A1* | 4/2018 | Kumar | .................. | G06N 20/00 |
| 2018/0218075 A1* | 8/2018 | James | .................. | G06F 16/313 |
| 2018/0365233 A1* | 12/2018 | Cherian | .................. | G06F 40/58 |
| 2019/0163752 A1* | 5/2019 | Barlaskar | ........... | G06K 9/00288 |

OTHER PUBLICATIONS

Ciocca, "Spotify's Discover Weekly: How machine learning finds your new music," hackermoon.com, Oct. 2017, 17 pages.

\* cited by examiner

PRESENT CONTROLLED HETEROGENEOUS DIGITAL CONTENT TO USERS

BACKGROUND

Recommendations systems typically propose content based on the preferences of the majority of customers such as best sellers and most played items. Traditional systems propose content based on the preferences of the user and of similar users. For example, a registered user of a video streaming provider that requests a sci-fi movie, a traditional recommendation service will recommend other sci-fi films. Unfortunately, with traditional systems many of these recommendations might have already been watched by the user, perhaps using a different video service.

Traditional recommendation systems provide solutions that give recommendations according to users' interests. Although this is the strength of traditional recommendation systems, this is also their weakness. This is because current solutions provide suggestions or recommendations in limited scopes. Once a user's interests have been identified, content that matches such interests are proposed. However, as time passes, a user of such traditional services receives more and more similar content and traditional services provide no functions to expand and extend the user's content interests into other areas.

BRIEF SUMMARY

An approach is provided to present controlled heterogeneous digital content to users. The approach receives topics corresponding to content items that were previously accessed by a user, such as having been watched by the user on a display device. Opposing topics are associated to the identified topics with each of the opposing topics being opposite to the corresponding topic. A user position score is calculated based upon at least some of the opposing topics. This position score is used to identify content recommendations which are then presented to the user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE SEVERAL VIEWS OF THE DRAWINGS

The present invention may be better understood, and its numerous objects, features, and advantages made apparent to those skilled in the art by referencing the accompanying drawings, wherein.

DETAILED DESCRIPTION

Figure 1:
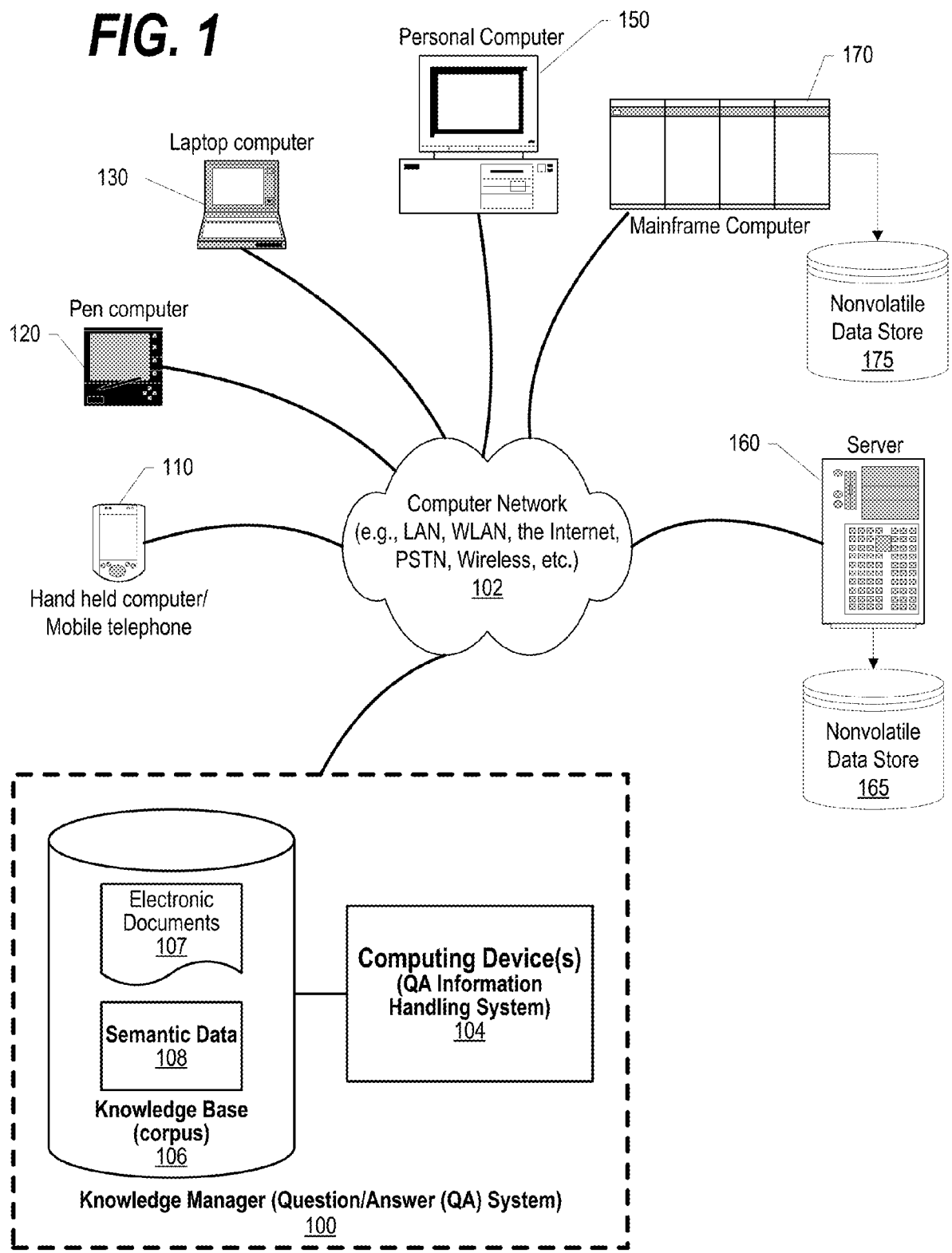
FIG. 1 depicts a schematic diagram of one illustrative embodiment of a question/answer creation (QA) system in a computer network.

FIGS. 1-7 depict an approach that presents controlled heterogeneous digital content to users. The approach described herein is able to provide new customized recommendations based on a user's position respect to a list of topics and, in a one embodiment, according to preferences manifested by the user. The approach is based on a reference system that includes a classification module, a profiling module, a position calculation module, and a recommendation module. The classification module classifies all of the topics of interest. For each topic classified, one or more opponent topics are also identified. Every user is profiled by the profiling module. After the collection of the user's data by the profiling module, the system calculates the user's position relative to antagonist topics. Given the user's position, the recommendation module proposes suitable digital content with the recommendations including antagonistic topics. New content is added to the system and classified by the classification module. User profiles are repeatedly updated whenever a user requests content. Periodically, user positions are re-evaluated by the calculation module to maintain updated scores in order to provide content suggestions. As used herein, "opposite" or "opposing" topics refers to a topic that would not be suggested to the user based on a topic map and the user's history in traditional systems. In other words, an "opposite" or "opposing" topic is a topic outside a threshold on the topic map. In addition, a distance scale could be applied to the topical distance between an identified topic and its opposing topic.

Below is an exemplary embodiment of the approach described herein. In this embodiment, a central system is used to collect the user's information and, on demand, provide the user's interests to other applications. The centralized system for each user stores an identifier that uniquely identifies the user, the user's positions relative to topics; and the user's interests and other user profile information. The user can be identified either anonymously through a browser cookie or with credentials that the user uses to log onto the central system. Given the user's identification, the user's usage of digital content is tracked and stored in the system. Through an interface, the user can access the central system to view their status (user's current positions) and to specify which topics they would like to discover/deepen (user's desired positions). When a user accesses digital content, the content provider receives the user's identifier (e.g., stored locally as a cookie or similar, etc.) and records the access of the content in the user's profile.

One goal of digital content providers is to propose content that is appreciated by the user. Because of this goal, the content provider is interested in knowing the user's preferences against its available tagged content. To achieve this, the content provider queries the central system with the user's identifier. The central system replies with the user's current topic positions, the user's desired topic positions, and a parameter that expresses the range for the shift from current to desirable positions. The content provider then elaborates a list of tags (topics) and a percentage for each tag that allow the user to move towards the desired state.

For example, when the user access the digital provider application, the content provider receives the user's identifier and requests {user_ID} to the centralized system. The centralized system replies with {user_ID, graph, c}, with the graph being a representation of the user's current topic positions and the user's desired topic positions, and c being a coefficient used to calculate opportune recommendations to produce the shift of the user's positions. The digital content provider identifies content in accordance with the received graph plus the parameter c, and then sends the recommendations back to the user. Finally, the content provider communicates to the centralized system regarding the content that has been selected by the user as well as the user's feedback if available so that the central system can automatically update the user's position.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

An example of QA system 100 may be the IBM Watson™ QA system available from International Business Machines Corporation of Armonk, N.Y., which is augmented with the mechanisms of the illustrative embodiments described hereafter. The QA knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
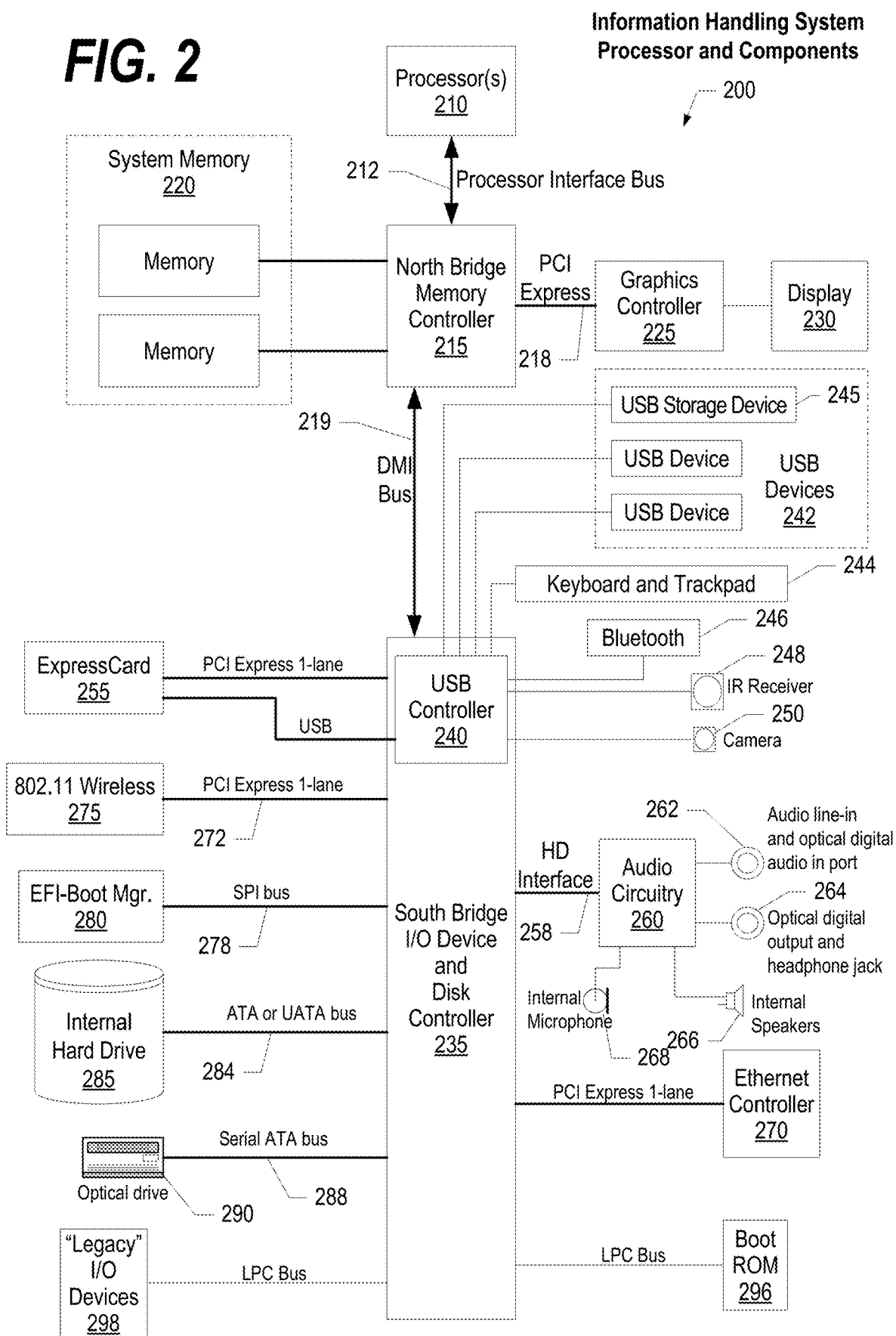
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
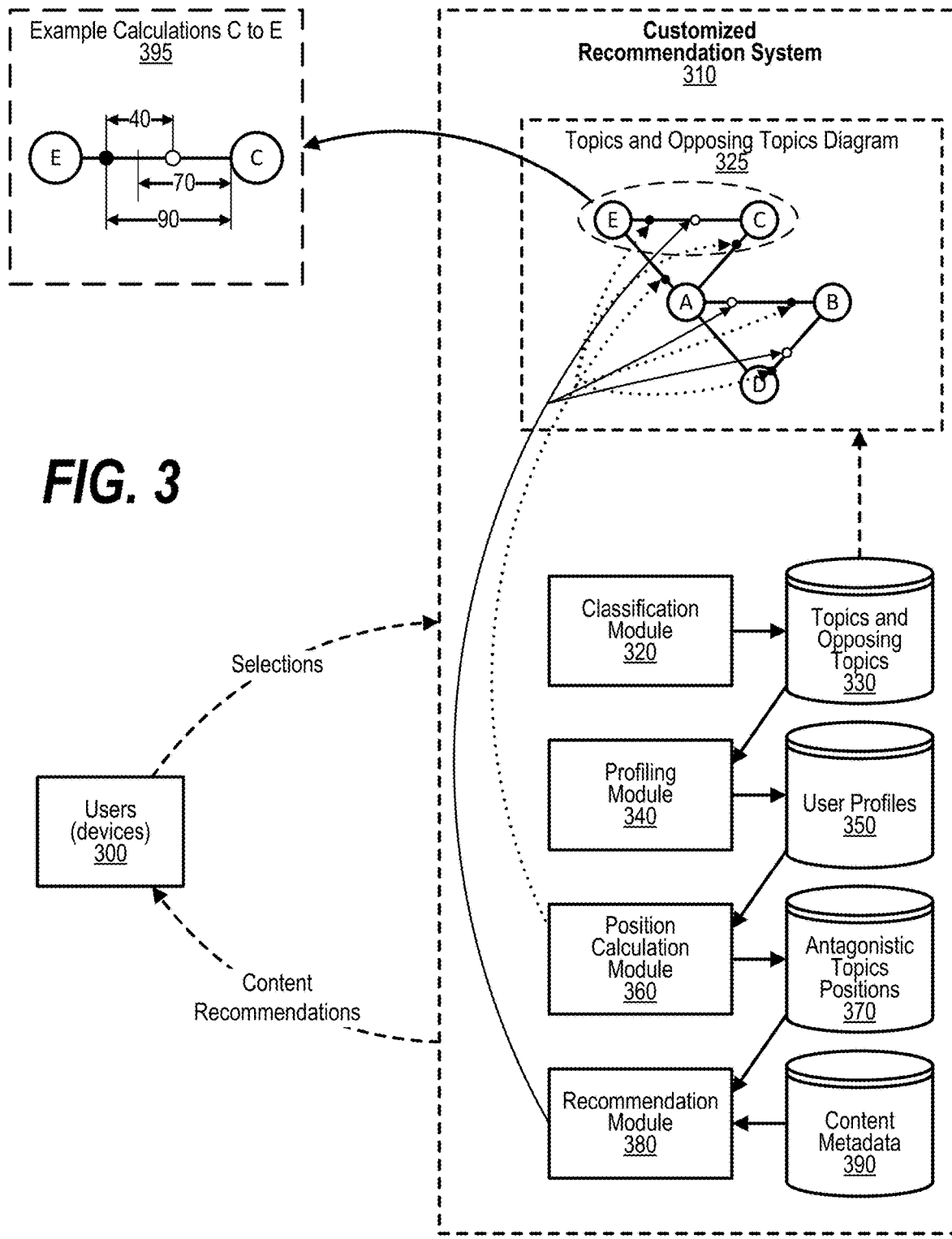
FIG. 3 is a system diagram depicting the components utilized in presenting controlled heterogeneous digital content to users.

FIG. 3 is a system diagram depicting the components utilized in presenting controlled heterogeneous digital content to users. Users 300 each utilize a device that is an information handling system, such as a mobile computing device, a desktop computer, a streaming content player, etc., to interact with customized recommendation system 310. The customized recommendation system performs several functions in order to present controlled heterogeneous digital content to users. As the term implies, "heterogeneous content" includes both content topics that matches the user's preferences, as noted by the user's consumption of digital content, as well as opposing content topics that do not currently match the user's preferences but are predicted by the system as being topics that might be enjoyed by the user to expand the range of topics, and accordingly content, that is recommended to the user.

Classification module 320 classifies content into topics. In one embodiment, module 320 also identifies opposing topics to the identified topics, while in another embodiment, opposing topics are determined later based on an analysis of the topics. Topics and opposing topic data are stored in data store 330. The classification is the definition of the analysis space and it contains a list of topics. This list of topics used in the classification module could vary according to the specific embodiments. In one embodiment, a topic is defined by a "tag" that is associated with a digital content and stored as metadata. Any digital content can be tagged with one or more topic, or "tag." As used herein, a "topic" is equivalent to a "tag" and each term can be used interchangeably with each other. Opposing topics (opposing tags) are those that are opposite of the topic (tag) found in the content. For each topic at least one opponent topic is generally available and is also associated with the content. Opponent tags might be retrieved from a dictionary a priori populated and based on common sense. Possible examples of topic-opposing topic pairs include black-white, left-right, American football-artistic gymnastics, horror-drama, etc. In different application fields, the classification system may leverage different dictionaries. Each topic of a content is tagged and connected to its opposing topics. The connection between a topic and its opposing topic is named distance and, in one embodiment, the value of the distance between topics is defaulted to 100. Topic-opposing topic chart 325 depicts a diagram of topics and opposing topics that might be stored in data store 330.

Diagram 325 depicts topics (tags) and opposing topics (opponent tags) and their relative distance from each other. A tag might have one or more opponent tags in common with other tags. Diagram 325 shows an example of opponent tags in common among a set of tags. Tags (topics) A and D have common opponent tag B; tags B, C and E have common opponent tag A. Also loops are possible where three or more tags have the same opponent tags. In the example shown, a loop is depicted for three tags: A, C and E. In this case tags C and E, although antagonists, have something in common as they are both opponent tags of A. Similarly, tags A and C versus tag E and tags A and E versus tag C.

Profiling module 340 uses data gathered by classification module 320 along with personal content access histories of the various users to develop user profiles that are stored in data store 350. Users are profiled evaluating their digital footprint to assess their areas of interest. A possible way to profile a user is through the sentiment analysis of a user's posted content on social media. Moreover, a user's interests are taken into account based on what digital content the user accesses on streaming channels, what the user reads and follows, as well as what the user buys online. This list of examples is not exhaustive and many other aspects might be considered. Profiling techniques may also vary based on the application field. If the user's position for one or more specific tags is not clear, the system might prompt the user with questions to improve the system's accuracy of the profiling step. In one embodiment, when the user profile analysis is initialized, each tag (topic) has a score equal to zero (0), with 0 indicating a neutral sentiment where the user show no interest, and a counter equal to 0 indicate that the user has never accessed to digital content pertaining to that tag.

For any given user, the score of a tag is calculated by counting the number of occurrences where the occurrences can be: (a) in a content posted by the user one or more classified tags can be retrieved; (b) the user either makes use of the social media "like" function (and similar functions) or positive comments posted by other users whose main topics can be retrieved; (c) if the user accessed a digital content whose topics are related to one or more classification tags. When an occurrence is found then, for the corresponding tag, the score is updated, and the counter of the number of occurrences is incremented. The score is increased when the user likes the topic (e.g., positive mood from sentiment analysis, usage of the "like" button in social media, the user follows a specific page/user classified with that tag, etc.). The percentage of the tag in the digital content is used to increment the associated score with a proportional value. In one embodiment, the score increase is a number between 0 and 1 (being 0%→0 and 100%→1). For example, a movie might be classified as having 80% action and 20% comedy 20%. In this case, if the user watches this movie, the tag associated to action will be increased by 0.8; the tag for comedy will be increased by 0.2; both the tag counters will be increased by 1.

As a result of this assessment procedure performed by the profiling module, the profiling system calculate scores for each tag and an associated counter value. Note that the number of occurrences might vary a lot among tags. For this reason, in one embodiment, at the end of the assessment procedure, the system normalizes the scores for each tag based on the number of occurrences. For instance, if the tag action has 2 occurrences, the first with 0.8 and the second with 0.4, its final score will be 0.6 ((0.8+,0,4)/2=0,6).

The normalization step is performed to take into account of the percentages of topics in digital content as they represent an aspect about user interests. For example, if the user watched ten (10) sport news whose content has 10% of F1 and 1 motoGP whose content is 100% motoGP, the normalization step allows the system to consider that the user likes F1 when it is a 10% of the content rather than a 100% of the content.

Position calculation module 360 takes the output from profiling module 340 to generate antagonistic topics positions that are stored in data store 370. After the user's interests have been evaluated by the profiling module, the system has a list of tags that is a subset of all the available tags in the classification system and a normalized score for each of them is also available. At this point the user's position are calculated for each couple of antagonist tags (e.g., tags "A" and "B" in diagram 325). The proximity of a user's location to a tag indicates the user's affinity towards that tag; the greater the distance between the user's location and tag, the less the user has shown interest in that tag.

In one embodiment, the scores that are used to determine the user's positions are normalized scores even when it is not explicitly specified. Given two opponent tags A and B shown in diagram 325, their normalized score are named a and b respectively; in this embodiment the distance between the two opponent tags is 100; with value p being the position of the user along the branch connecting A and B; the position, expressed as the users distance between the opposing tags, represents the affiliation coefficient of the user for the tag; db is the distance of the user from the tag B; while da=(100−db) represents the distance of the user from the tag A. Given the above, if db=100 the user's position coincides with the tag A, and conversely, if db=0 the position coincides with the tag B. In the case where two opponent tags have the same score, the resulting user's position will be equidistant from the two tags (da=db=50).

The user's position will be calculated with the following formulas:

$$db=a/(a+b)\times 100; \text{ and}$$

$$da=b/(a+b)\times 100$$

The following provides a numerical example of calculating the user's position by position calculation module 360. Assuming a=0.02 and b=0.78:

$$db=0.02/(0.02+0.78)\times 100=2.5$$

In this case the user's position is near the tag B.
Another numerical example is provided below:
Tag A has zero (0) occurrences (associated score is 0) and opponent tag B has five occurrences, each occurrence having a score of 1 (associated normalized score is 1).

$$a=0, b=1$$

$$db=0/(0+1)\times 100=0$$

In this case the user's position overlaps the tag B because the user's distance from B is 0; user's distance from A is 100.

At the end of the phase performed by position calculation module 370, the user's positions for all tags of interest are known. A possible graphical representation of this user status is depicted in diagram 325 with the user's positions shown as solid circles on the respective lines between the topics and respective opposing topics. Data resulting from module 370 is stored in data store 370.

Recommendation module 380 provides recommendations to the user given the user's current position relative to topics and opposing topics. Recommendation module uses topic positions and opposing topic positions along with the user's desired position to move the user's position from the current position towards the user's desired position. Content metadata 390 is compared with the user's position data to select content that moves the user's position in the desired direction.

The system provides the user with their current status and prompts the user regarding topics (opposing topics) in which the user is interested in receiving content, such as to discover a new topic (e.g., an opposing topic to an already familiar topic of the user) or to deepen a topic already known by the user. In particular, given the user's positions, the user can express a desirable position for one, several or all of their current positions. Diagram 325 depicts the user's current and desired positions as solid circles (current positions) and open circles (desired positions). Note that the desired positions are a subset of the current user's positions. From the preferences expressed by the user, the recommendations system provides a list of suggestions for the user. The suggestions are calculated to, over time, move the user's position from the user's current position (solid circle) to the desired position (open circle). How gradually the user's position is shifted is evaluated according to a parameter c.

Block 395 depicts an example of calculations between two of the topics shown (C and E). In the example, the user has a distance de=10 from topic E compared to opposing topic C (dc=90) and the user has expressed an interest in arriving at position with de=50. Diagram 325 further depicts the user's current position (solid circles) and the user's desired positions (open circles). The system identifies content from metadata 390 to move the user's position towards the tag C. For the provided example, and assuming the coefficient c is 50%, valid suggestions are content containing tag C such that dc is between 70 and 90. Recommendation module identifies digital content for the user that has the desired coefficient with topic C being expressed more than topic E in order to move the user's position away from topic E and towards topic C. The selection of content, related to the tags of interest for the user and the associated percentage, is chosen by module 380 checking metadata 390 and possibly other data sources to identify content that are enjoyed by other users and moves the position towards topic C. In one embodiment, the module analyzes the users with positions near the tags associated with the areas of interest and digital content is chosen for recommendation according to what the community of users consumed. If the user indicates an interest in deepening knowledge of a particular topic, module 380 recommends digital content to the user that is classified with the desired topic in a percentage according to parameter c, and with, for instance, the highest number of views, positive feedbacks and so on, by other users.

Figure 4:
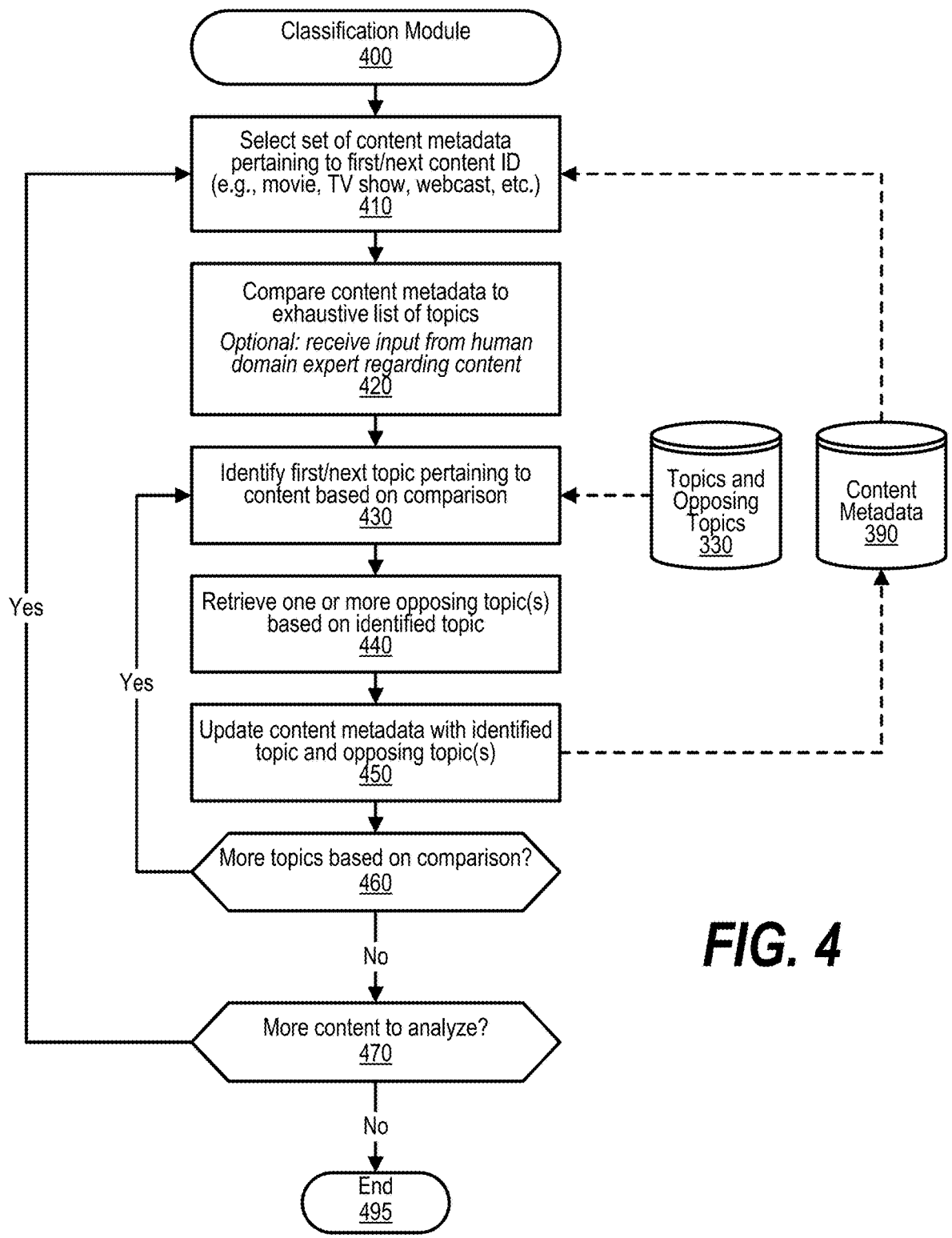
FIG. 4 is a flowchart showing steps performed by a classification module.

FIG. 4 is a flowchart showing steps performed by a classification module. FIG. 4 processing commences at 400 and shows the steps taken by a classification module. Other details regarding the classification module can be found in the description of FIG. 4. At step 410, the process selects a set of content metadata that pertains to a first content identifier (e.g., a movie, a TV show, a webcast, etc.). The content identifiers are selected from data store 390. At step 420, the process compares the content metadata to an exhaustive list of topics. In addition, optionally, the process can receive input from a human domain expert regarding content and topics found in such content. At step 430, the process identifies the first topic that pertains to the selected content based on the comparison performed in step 420 with topics and opposing topics being retrieved from data store 330. At step 440, the process retrieves one or more opposing topics based on the identified topic. At step 450, the process updates the content metadata with the identified topic and opposing topics. The process determines as to whether there are more topics to process based on comparison (decision 460). If there are more topics to process, then decision 460 branches to the 'yes' branch which loops back to step 430 to select and process the next topic pertaining to the selected content. This looping continues there are no more topics to process for the selected content, at which point decision 460 branches to the 'no' branch exiting the loop. The process determines as to whether there are more content to analyze (decision 470). If there are more content to analyze, then decision 470 branches to the 'yes' branch which loops back to step 410 to select the metadata from the next content described in content metadata 390. This looping continues until there is no more content in content metadata 390 to process, at which point decision 470 branches to the 'no' branch exiting the loop. FIG. 4 processing thereafter ends at 495.

Figure 5:
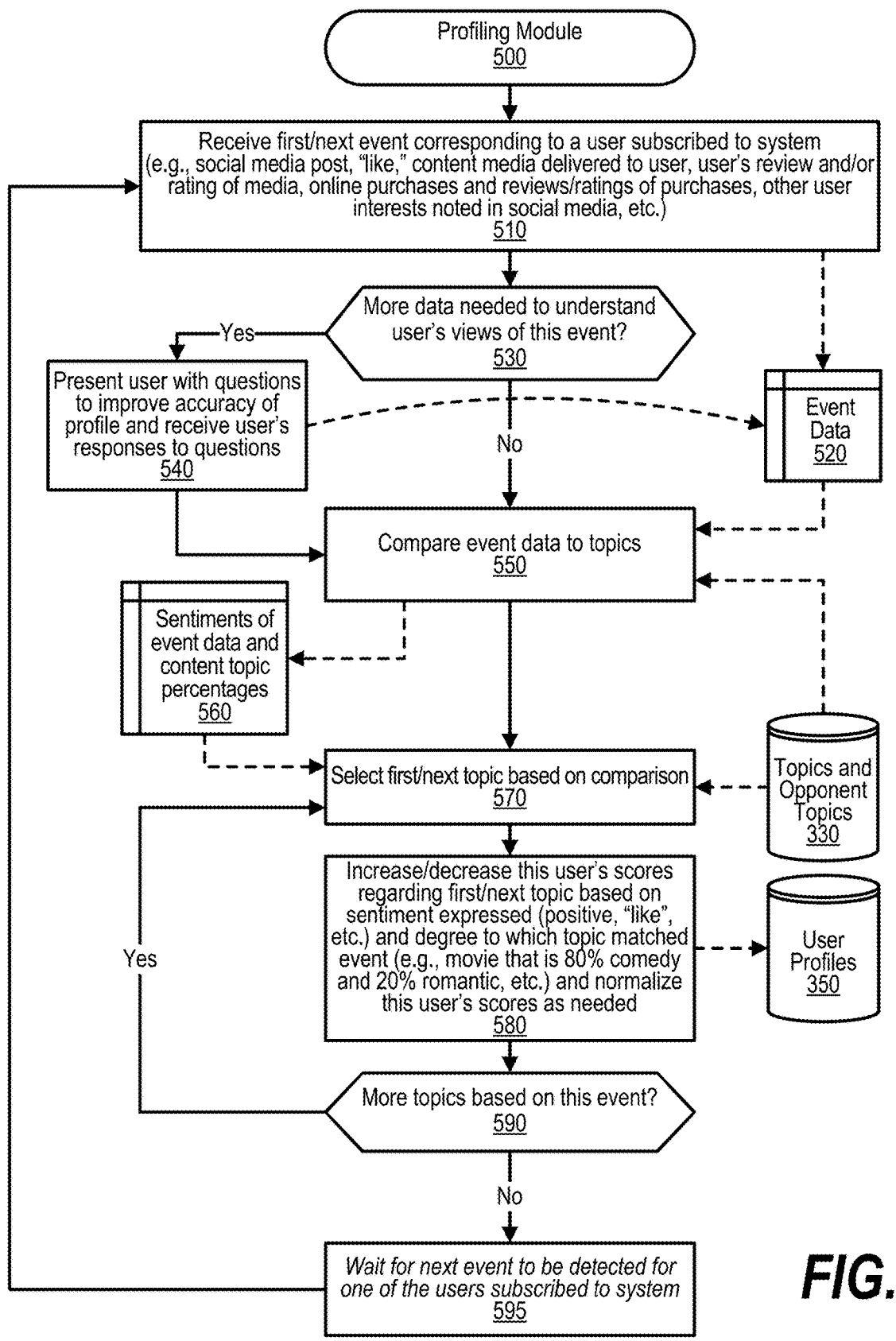
FIG. 5 is a flowchart showing steps performed by a profiling module.
Figure 6:
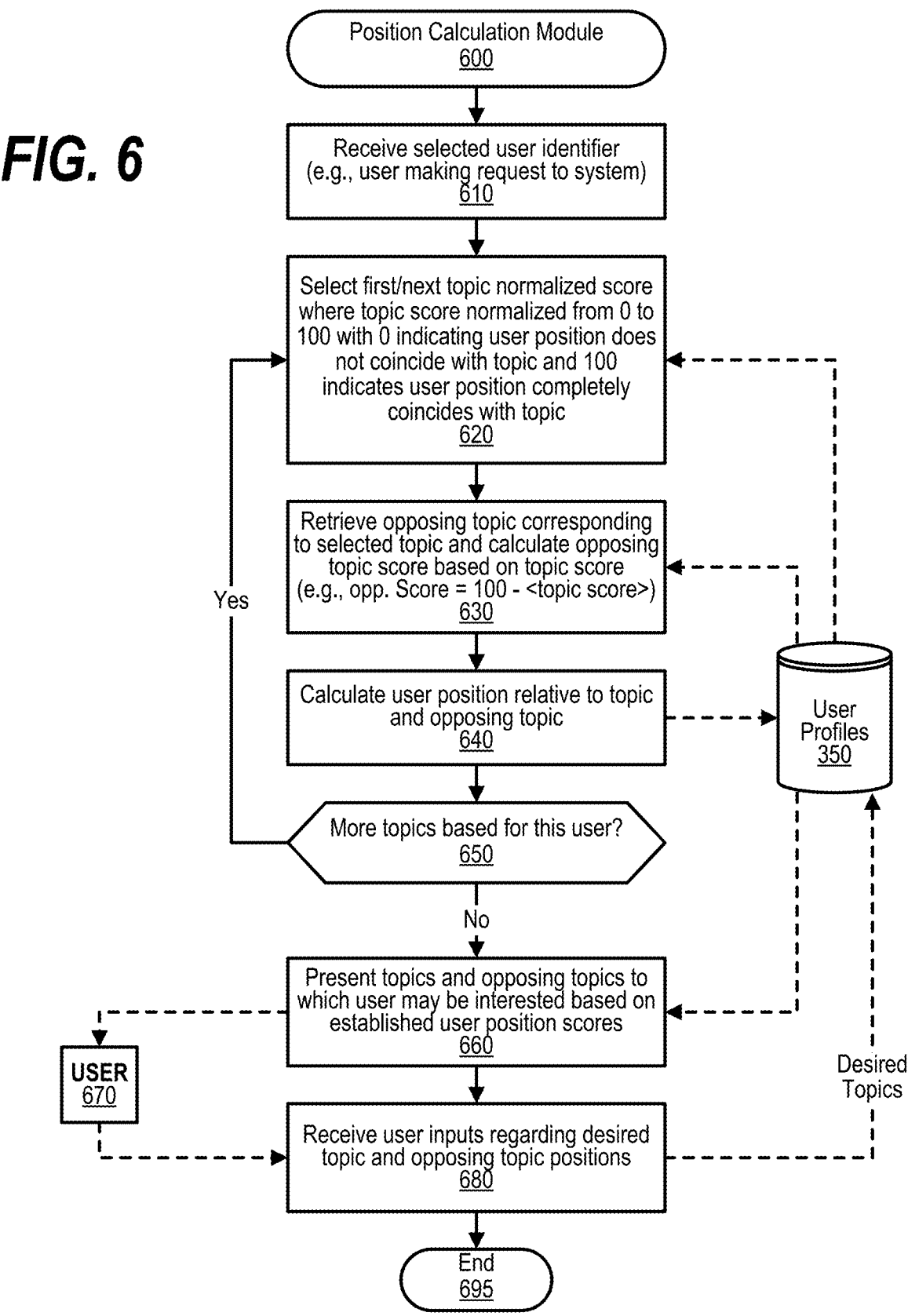
FIG. 6 is a flowchart showing steps performed by a position calculation module.

FIG. 5 is a flowchart showing steps performed by a profiling module. FIG. 5 processing commences at 500 and shows the steps taken by a profiling module that profiles a user. Further details regarding the profiling module can also be found in FIG. 3. At step 510, the process receives the first event corresponding to a user that is subscribed to the system (e.g., a social media post, a "like" indicator, content media delivered to user, a user's review and/or rating of content, online purchases related to content, reviews, ratings, etc. of purchases, and other user interests noted in social media, etc. The event data is stored in memory area 520. The process determines as to whether more data is needed in order to understand the user's views of this event (decision 530). If more data is needed, then decision 530 branches to the 'yes' branch to perform step 540. On the other hand, if not more data is needed, then decision 530 branches to the 'no' branch bypassing step 540. If more data is needed then, at step 540, the process presents the user with one or more questions to improve the accuracy of the profile and the system receives the user's responses to such questions with the additional event data being stored in memory area 520. At step 550, the process compares the event data stored in memory area 520 to topics retrieved from data store 330. The result of the comparison are sentiments of event data and content topic percentages that are stored in memory area 560. At step 570, the process selects the first topic based on comparison performed at step 550. At step 580, the process increases or decreases this user's scores regarding the first topic based on sentiment expressed (positive, "like", etc.) and the degree to which the topic matched the event (e.g., a movie that is 80% comedy and 20% romantic, etc.). The process normalizes the user's scores as needed. The process determines whether there are more topics that are based on this event (decision 590). If there are more topics based on this event, then decision 590 branches to the 'yes' branch which loops back to step 570 to select and process the next topic for the event. This looping continues until there are no more topics to process, at which point decision 590 branches to the 'no' branch exiting the loop. At step 595, the process waits for the next event to be detected for one of the users subscribed to the system. When a new event is detected, processing loops back to step 510 to process the event FIG. 6 is a flowchart showing steps performed by a position calculation module. Further details regarding position calculation processing can be found in the description of FIG. 3. FIG. 6 processing commences at 600 and shows the steps taken by a position calculation module. At step 610, the process receives a selected user identifier such as from a user that is making a request to the system, a content provider making a request on behalf of a user, and the like. At step 620, the process selects the first topic normalized score from data store 350. In one embodiment, the topic score is normalized from 0 to 100 with 0 indicating that the user position does not coincide with the topic and 100 indicating that the user position completely coincides with the topic. At step 630, the process retrieves an opposing topic from data store 350 with the retrieved opposing topic corresponding to the selected topic. The process further calculates the opposing topic score based on the topic score. For example, if a 100 point total scoring system is enabled and the topic score is 60 then the opposing topic score would be 40 so that the combined score of the topic and the opposing topic would equal 100. At step 640, the process calculates the user's current position score relative to the topic and the opposing topic by using the respective scores. The user's current position score is stored in data store 350. The process determines as to whether there are more topics corresponding to this user, such as found in content that the user has accessed (decision 650). If there are more such topics, then decision 650 branches to the 'yes' branch which loops back to step 620 to select and process the next topic as described above. This looping continues until there are no more topics to process, at which point decision 650 branches to the 'no' branch exiting the loop. At step 660, the process presents the set of topics and respective opposing topics to user 670 with these topics and opposing topics being retrieved from data store 350. In one embodiment, the user may also indicate a desired position between a topic and a relative topic so that the system can recommend content designed to move the user's position from the user's current position in the direction of the user's desired position. The presentation of topics and opposing topics allows the user to review topics in which the user may be interested based on the user's established position scores. At step 680, the process receives the user's inputs regarding desired positions between topics and opposing topic. This desired position is used by the recommendation system to select recommendations designed to move the user's position from the user's current position in the direction of the user's desired position. The user's desired position is stored in data store 350. FIG. 6 processing thereafter ends at 695.

Figure 7:
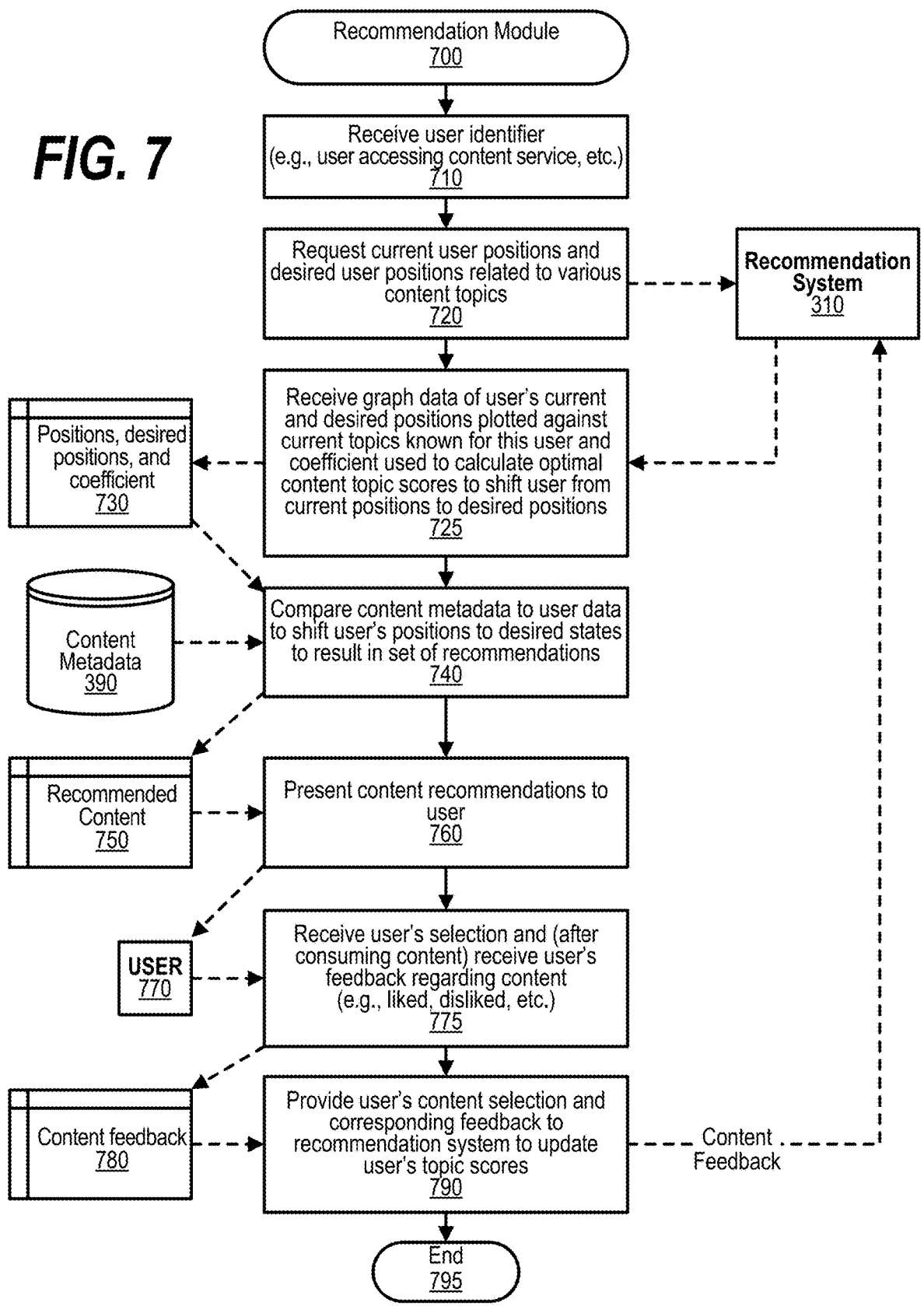
FIG. 7 is a flowchart showing steps performed by a recommendation module.

FIG. 7 is a flowchart showing steps performed by a recommendation module. Further details regarding recommendation processing can be found in the description of FIG. 3. FIG. 7 processing commences at 700 and shows the steps taken a recommendation module. At step 710, the process receives a user identifier of the user for which recommendations are being requested. For example, the user can provide the user identifier when accessing the content service or recommendation system or a content streaming service can provide the user's identifier on behalf of the user. At step 720, the process requests the user's current and desired positions from recommendation system 310. The user's current and desired positions are related to various content topics. At step 725, the process receives a graph, or graph related data, corresponding to the user's current and desired positions plotted against current topics known for this user and coefficient used to calculate optimal content topic scores to shift user from current positions to desired positions. In one embodiment, a coefficient is used to determine how quickly the system will attempt to shift the user's position from the user's current position to the user's desired position. The data received from recommendation system 310 is stored in memory area 730. At step 740, the process compares content metadata that is retrieved from data store 390 to the user data stored in memory area 730 to identify content designed to shift the user's topic positions from the user's current positions towards the user's desired positions. The content found as a result of the comparison is stored in memory area 750. At step 760, the process presents the recommended content stored in memory area 750 to user 770, such as displaying the recommendations on a display screen attached to the user's information handling system. At step 775, the process receives the user's content selection from user device 770. In addition, in step 775, the process receives the user's feedback regarding the content after such time as the user has consumed (e.g., watched, etc.) the content. The user's feedback might be a quantitative score (e.g., rating from 1 to 10), whether the user liked or disliked the content, a subjective review or posting regarding the content by the user, and the like. The user's feedback is stored in memory area 780. At step 790, the process sends the user's feedback stored in memory area 780 and the user's content selection (e.g., movie name/identifier, etc.) back to recommendation system 310. The recommendation system can used the data to update the user's topic scores and store such scores in the profile area corresponding to the user.

These updated topic scores can then be used for future user analysis and recommendations of content to the user. FIG. 7 processing thereafter ends at 795.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A method comprising:
   receiving a plurality of topics corresponding to a plurality of content items previously accessed by a user;
   associating a plurality of opposing topics to the plurality of topics, wherein each of the opposing topics are opposite to at least one of the plurality of topics;
   determining a set of current topic scores and a set of desired topic scores, wherein each of the current topic scores and each of the desired topic scores pertain to one of the plurality of topics, and wherein the current topic scores and the desired topic scores correspond to the user;
   graphing a set of current topic nodes that depict a topic-opponent topic relationship of each of the plurality of topics, the graphing based on a plurality of topic weight values and a plurality of opposing topic weight values pertaining to each of the topics;
   graphing a set of desired topic nodes that depict a desired score pertaining to each of the topics;
   calculating a user position score based upon one or more of the opposing topics, wherein the calculating comprises calculating one or more coefficients pertaining to a position of each of the desired topic nodes relative to their respective current topic nodes, wherein the coefficients are values calculated to optimally shift the current topic nodes to the desired topic nodes;
   identifying a plurality of content recommendations based on the calculated user position score; and
   presenting the content recommendations to the user.

2. The method of claim 1 further comprising:
   determining a topic weight value corresponding to each of the topics that correspond to the content items; and
   calculating an opposing weight value corresponding to each of the opposing topics, wherein the opposing weight value of each opposing topic is based on the topic weight value of the respective topic.

3. The method of claim 2 further comprising:
   determining a multiplier for each of the topics, wherein the multiplier is based on an extent to which each of the previously accessed content items exhibits each of the plurality of topics; and
   adjusting the topic weight values and the opposing weight values based on the determined multipliers.

4. The method of claim 1 further comprising:
   storing the topics and opposing topics in a metadata corresponding to each of the content items.

5. An information handling system comprising:
   one or more processors;
   a memory coupled to at least one of the processors;
   a set of computer program instructions stored in the memory and executed by at least one of the processors in order to perform actions of:
      receiving a plurality of topics corresponding to a plurality of content items previously accessed by a user;
      associating a plurality of opposing topics to the plurality of topics, wherein each of the opposing topics are opposite to at least one of the plurality of topics;
      determining a set of current topic scores and a set of desired topic scores, wherein each of the current topic scores and each of the desired topic scores pertain to one of the plurality of topics, and wherein the current topic scores and the desired topic scores correspond to the user;
      graphing a set of current topic nodes that depict a topic-opponent topic relationship of each of the plurality of topics, the graphing based on a plurality of topic weight values and a plurality of opposing topic weight values pertaining to each of the topics;
      graphing a set of desired topic nodes that depict a desired score pertaining to each of the topics;
      calculating a user position score based upon one or more of the opposing topics, wherein the calculating comprises calculating one or more coefficients pertaining to a position of each of the desired topic nodes relative to their respective current topic nodes, wherein the coefficients are values calculated to optimally shift the current topic nodes to the desired topic nodes;
      identifying a plurality of content recommendations based on the calculated user position score; and
      presenting the content recommendations to the user.

6. The information handling system of claim 5 wherein the actions further comprise:
   determining a topic weight value corresponding to each of the topics that correspond to the content items; and
   calculating an opposing weight value corresponding to each of the opposing topics, wherein the opposing weight value of each opposing topic is based on the topic weight value of the respective topic.

7. The information handling system of claim 6 wherein the actions further comprise:
   determining a multiplier for each of the topics, wherein the multiplier is based on an extent to which each of the previously accessed content items exhibits each of the plurality of topics; and
   adjusting the topic weight values and the opposing weight values based on the determined multipliers.

8. The information handling system of claim 5 wherein the actions further comprise:
   storing the topics and opposing topics in a metadata corresponding to each of the content items.

9. A computer program product stored in a computer readable storage medium, comprising computer program code that, when executed by an information handling system, causes the information handling system to perform actions comprising:

receiving a plurality of topics corresponding to a plurality of content items previously accessed by a user;

associating a plurality of opposing topics to the plurality of topics, wherein each of the opposing topics are opposite to at least one of the plurality of topics;

determining a set of current topic scores and a set of desired topic scores, wherein each of the current topic scores and each of the desired topic scores pertain to one of the plurality of topics, and wherein the current topic scores and the desired topic scores correspond to the user;

graphing a set of current topic nodes that depict a topic-opponent topic relationship of each of the plurality of topics, the graphing based on a plurality of topic weight values and a plurality of opposing topic weight values pertaining to each of the topics;

graphing a set of desired topic nodes that depict a desired score pertaining to each of the topics;

calculating a user position score based upon one or more of the opposing topics, wherein the calculating comprises calculating one or more coefficients pertaining to a position of each of the desired topic nodes relative to their respective current topic nodes, wherein the coefficients are values calculated to optimally shift the current topic nodes to the desired topic nodes;

identifying a plurality of content recommendations based on the calculated user position score; and presenting the content recommendations to the user.

10. The computer program product of claim 9 wherein the actions further comprise:

determining a topic weight value corresponding to each of the topics that correspond to the content items; and calculating an opposing weight value corresponding to each of the opposing topics, wherein the opposing weight value of each opposing topic is based on the topic weight value of the respective topic.

11. The computer program product of claim 10 wherein the actions further comprise:

determining a multiplier for each of the topics, wherein the multiplier is based on an extent to which each of the previously accessed content items exhibits each of the plurality of topics; and adjusting the topic weight values and the opposing weight values based on the determined multipliers.

* * * * *